May 28, 1929. R. VON BROCKDORFF 1,715,018
ELECTRIC HEATING MEANS
Filed May 17, 1928
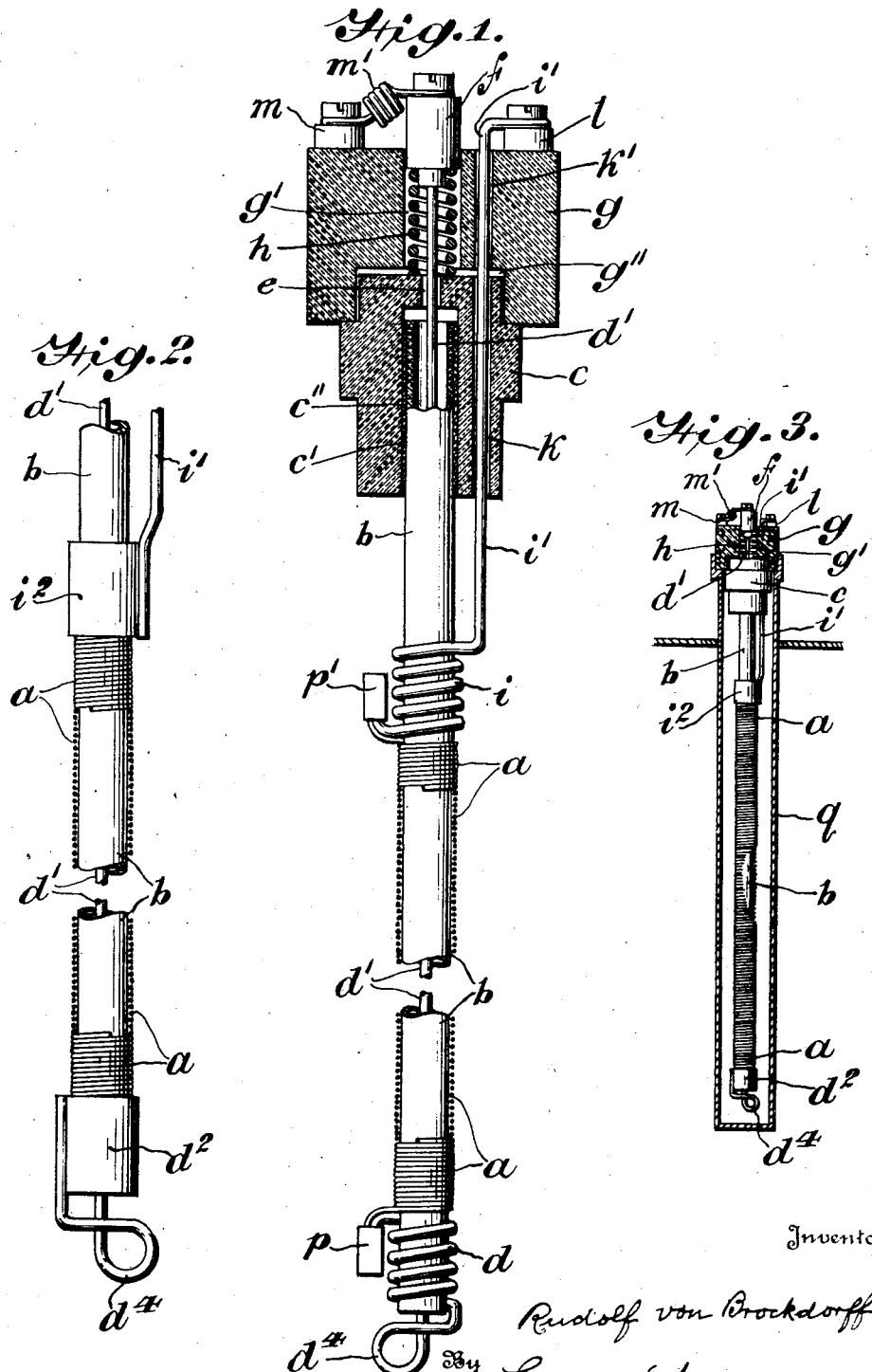
Inventor
Rudolf von Brockdorff
By Cyrus N. Anderson
Attorney Patented May 28, 1929.

1,715,018

UNITED STATES PATENT OFFICE.

RUDOLF VON BROCKDORFF, OF MUNICH, GERMANY, ASSIGNOR TO SCHUTTE AND KOERTING COMPANY, OF PHILADELPHIA, PENNSYLVANIA, A CORPORATION OF PENNSYLVANIA.

ELECTRIC HEATING MEANS.

Application filed May 17, 1928, Serial No. 278,454, and in Germany September 17, 1926.

My invention relates to electric heating means and is of a character whereby devices embodying the same may be adapted for the heating of boiler tubes, for supplying the heating means for hot water heaters, for supplying the heating means for stoves, radiators and the like, and for other purposes which readily will occur to those skilled in the art to which the invention relates.

In electrical heaters as heretofore known and manufactured it has been the practice generally, as far as I am aware, to imbed the electrically heated elements within insulating material of one kind or another. Electrical heaters of that character and construction have been found, in practice, to be open to objections among which may be mentioned the over-heating of the current resistance element and the consequent destruction thereof, and also the burning of and injury to the insulating material within which the resistance element may be imbedded.

It is the object, therefore, of this invention to provide an electric heater of simple but novel construction and of a character to avoid the objections incident to heaters of the character heretofore employed in practice.

It also is an object of the invention to provide an electric heater of novel construction and of a character such that the heating element or elements are not imbedded in a supporting structure, but on the contrary, are spaced therefrom whereby over-heating thereof is avoided.

A further object of the invention is to provide an electric heating means of novel construction wherein the heating elements are insulated from the structure being heated and wherein also the heating of the structure is effected by radiation rather than by conduction.

Another object of the invention is to provide a structure wherein the heating element may respond to the variable conditions produced by the heating thereof without injury thereto and without injury to the means by which the said element is held or retained in operative position with respect to the remaining portion of the heater structure.

Still another object of the invention is to provide a yielding element located outside of the high temperature zone of the structure and having operative connection with the heating element and with parts associated therewith and acting as a compensating controlling means during variations of temperature of the heating element of the structure.

I shall not at this point in the specification undertake to set forth more fully or in greater detail the objects and advantages of and incident to the invention but such further objects and advantages will be referred to specifically and in detatil in the succeeding portion of the specification or will become apparent therefrom.

For the purpose of aiding in the understanding of the invention I have provided a drawing illustrative thereof which is annexed to and forms a part of this specification and to which reference should be made in the reading of the specification for a clearer understanding of the invention than otherwise might be had.

In the drawing:

Fig. 1 is a view in longitudinal sectional elevation of an electrical heater device embodying the invention;

Fig. 2 is a view in elevation of the lower portion of the structure shown in Fig. 1 but showing a modified mechanical embodiment of the invention; and Fig. 3 is a view in side elevation of the heater device mounted within a tube to be heated, the said tube being shown in longitudinal section, and the said heater device embodying the construction indicated in Fig. 2, the latter being in simpler form and more readily illustrated. However, it will be understood that either form of construction may be mounted within a tubular section or the like to be heated.

In the drawing I have shown a heater device comprising a tube $b$ of insulating material, such as mica, upon which the heater element $a$ is adapted to be supported. The said heater element consists of a wire of suitable resistance material, such as chrome nickel. It is coiled about the tubular support $b$. Preferably the wire should be coated with insulating material and it has been found that a coating of oxide is sufficient in practice to prevent short circuiting of the coils. The coils should be located in contact relation as illustrated and are yieldingly held in such relation to each other in the manner and by the means as hereinafter will be fully described. For some reasons mica is preferable for use as the insulating material but in some respects it is open to objection. It is capable of undergoing sudden relatively great changes in temperature without injury, but it is lacking in the power of resistance to mechanical forces. It is necessary, therefore, in the winding of the resistance wire about the same to form the heating coil $a$ as illustrated so that the latter does not contact with or bind tightly upon the cylindrical surface of the tube. If it does so contact or bind the variations in the diameter of the coil due to changes in temperature may cause the tube to collapse or crush. The coil $a$ therefore is so related to the tube as to be retained in position thereby but not so as to apply compressive stresses thereon of sufficient force to crush or cause the same to collapse.

Although the tube $b$ is referred to as consisting of mica it is to be understood that it may consist of any other material of insulating character which may be found to be suitable from a practical stand-point.

The outer end portion of the tube $b$ projects into an opening $c'$ of an insulating member or head $c$ which may consist of steatite. It will be noted that the diameter of the opening $c'$ is slightly greater than the external diameter of the tube $b$. In order, therefore, to bind and hold the tube in place within the said head $c$ the space between the tube $b$ and the inclosing walls of the opening $c'$ is filled with a suitable packing material such as asbestos $c''$. In practice the latter is provided in the form of a string which is wound around the tube $b$. It will be seen, therefore, that a more or less yielding protection is provided between the tube and the head $c$. The head $c$ is in turn mounted upon a block $g$ of insulating material such as steatite, the latter being provided with a recess as indicated at $g''$ into which a reduced end portion of the head $c$ projects. The head and block $c$ and $g$ may be secured together by any suitable known means, as for instance, bolts, not shown. The said head and block should not be drawn too tightly together but should be loosely held in order that there may be the necessary relative expansion and contraction. There will be relative expansion and contraction because the head $c$ is heated to a temperature very much higher than that of the larger block $g$, because it is located in practice within the heated chamber within which the heating element of the device is located.

The head $c$ is provided with a small opening or passageway $e$ which leads from the opening $c'$ therein into an axial opening $g'$ within the block G, the inner end of said opening terminating in the larger opening $g''$ provided upon the inner end of the said block $g$.

The inner end of the wire of the coil $a$ is connected to a coupling $p$ which in turn is connected to an end of a coil $d$ of relatively large wire which is coiled around the inner end portion of the tube $b$ and is provided with an extension which is connected by means of a loop $d^4$ to the inner end of the wire $d'$ which extends through and axially of the tube $b$ and which extends also through the opening $e$ previously referred to and through the axial opening $g'$ and is connected at its outer end to a metal member $f$ which is slidably mounted within the outer end portion of the opening $g'$. A coiled wire spring $h$, mounted within the opening $g'$ and bearing at its inner end against the outer end of the head $c$ and at its outer end against the inner end of the slidable metal member $f$, tends to push and hold the latter in its outermost position. The outer end of the slidable member $f$ is provided with a binding post to which one end of a wire having an intermediate coil $m'$ is connected, the opposite end thereof being connected to a binding post $m$. The opposite or outer end of the coil $a$ is extended and is connected by means of a coupling $p'$ to a coil $i$ provided at the inner end of a wire $i'$ which extends outwardly through openings $k$ and $k'$ provided in the head $c$ and block $g$ in alinement with each other as shown. The outer end of the wire $i'$ is connected to a binding post $l$.

It may be noted that the wires of the coils $d$ and $i$ and $d'$ and $i'$ are of considerably greater diameter or gage than the wire of the coil $a$.

The current may be supplied to the coil $a$ through the wire $i'$ and conducted from the said coil through the coil $d$ and the wire $d'$, or the current may flow in the opposite or reverse direction.

The coils $d$ and $i$ are loosely or slidably mounted upon the insulating tube $b$.

It will be understood that when the device is used and when the coil $a$ has been raised to a high temperature expansion thereof results, and it also will be understood that upon the cooling thereof contraction takes place. The diameter of the coil, however, is such that in the latter instance it does not bind with sufficient tightness and force against the tube $b$ to cause crushing or collapsing thereof. Also as the heat of the coil varies the wire $d'$ expands or contracts as the temperature increases or decreases. The spring $h$ previously referred to, which is outside of the heat zone of the device, tends constantly to expand and exerts a pulling force upon the wire $d'$ to compensate for the variations of the length thereof due to variations in temperature. The action of the spring $h$ operates to yieldingly hold the turns of the coil $a$ in contact with each other.

The construction illustrated in Fig. 2 of the drawing is identical with that shown in Fig. 1 except that the coils $d$ and $i$ are replaced by tubular sections or sleeves $d^2$ and $i^2$. These sleeves are slidably mounted upon the tube $b$ and function in identically the same manner as the coils $d$ and $i$.

In Fig. 3 I have shown a heating device embodying the invention mounted within a tube $g$. In said Fig. 3 the sleeves $d^2$ and $i^2$ are shown instead of the coils $d$ and $i$ because of the ease with which they may be drawn and not because there is any difference in function. As a matter of fact, if there is any difference the construction including the coils $d$ and $i$ is preferred to that including the tubular sections or sleeves $d^2$ and $i^2$.

Upon reference to Fig. 3 it will be noted that neither the heating element nor any part of the electric circuit including the said element contacts with any part of the structure being heated. There is, therefore, no chance of short circuiting through any part of the structure or apparatus being heated. Also it will be noted that the heating of the tube $g$ is effected by radiation and not by conduction. The space within the tube surrounding the heating element is not filled with water but with air or other suitable gas. In consequence the construction is highly suitable for use in the heating of water for domestic purposes because in view of the insulation of the circuit and heating coil from the apparatus there is no danger of any part of the latter becoming electrically charged. In cases where the electrically heated element is in contact with any part of the apparatus or in which the support for the heating element is in contact with water which is being heated, the apparatus or some part thereof has been known to become charged and to cause injury to a person or persons who might contact with such charged part or portion. By my invention the possibility of such an accident is entirely eliminated.

It may be noted that while the heating coil $a$ does not bind tightly upon the insulating tube $b$ yet the latter will prevent the same from sagging in case the heating means is supported in a horizontal position and the wires $d'$ and $i'$, the coils $d$ and $i$, and the wire coil $h$ operate to retain the heating coil $a$ in proper position upon the said tube when the heating means is supported in a vertical position.

Having thus described my invention, what I claim and desire to secure by Letters Patent is:

1. An electric heating means, comprising a tube of insulating material, means for supporting the said tube, a coil of resistance wire coiled about said tube and loosely mounted thereon, members slidably mounted upon said tube and located thereon in adjoining relation to the opposite ends of the said coil, the opposite ends of the wire of said coil being connected to the said members, a connection leading from one of the said members through the said tube to a point outside of the said heating means, and yielding means located out of the heating zone of the heating means which exerts pulling force upon the said connection.

2. An electric heating means, comprising a tube of insulating material, means for supporting said tube, a coil of resistance wire loosely mounted upon the said tube, binding posts located outside of the heating zone of the said heating means, leads from the said binding posts to the opposite ends of the said heating coil, the said leads terminating in coils in adjoining relation to the opposite ends of the said heating coil, the said terminal coils being loosely and movably mounted upon the said tube and one of the said leads extending through the said tube, a slidable member to which the last mentioned lead is connected, means for slidably supporting the said member, and yielding means acting upon the said slidable member and operating to apply a pulling force to the last mentioned lead under tension.

3. An electric heater, comprising a tube of insulating material, supporting means of insulating material for the said tube, an opening extending through the said supporting means, a member slidably mounted within the outer end of the said opening, a coil of resistance wire mounted upon the said tube, lead wires having connection with and extending from the opposite ends of the said coil, the said lead wires being provided with a number of coils mounted upon the said tube and located in adjoining relation to the opposite ends of the first named coil, and the wire of one of the last mentioned coils being extended through the said tube and through the pasageway in the support therefor and having connection at its outer end with the said slidable member, and yielding means acting upon the said slidable member to hold the said wire extension under tension.

4. An electric heater, comprising a tube of insulating material, a two-part supporting means for the said tube, the said parts being connected so as to permit independent expansion and contraction thereof, the said tube being connected to one of said parts and the said parts having an opening extending therethrough in alinement with the said tube, a resistance wire coil mounted loosely upon the said tube, members movably mounted upon the said tube in adjoining relation to the opposite ends of the said coil, the opposite ends of the wire of the latter being connected to the said members, wire leads extending from the said members, one of the said leads extending through the said tube and through the opening through the said supporting means, a member slidably mounted in the outer end of the opening through said supporting means to which the last mentioned lead is connected, and resilient means acting upon the said slidable member to impose a pulling tension upon the last mentioned lead which tension operates to apply a compressive pressure to the said coil.

5. An electric heating means, comprising an electric circuit including a coil of resistance wire and leads of wire having connection with the opposite ends of the coil of resistance wire, said leads including coils in adjoining relation to the opposite ends of the said coil of resistance wire, means for supporting all of said coils, and means acting upon one of the said leads to exert pressure upon the said coils to compensate for the exansion and contraction which may result from variations in the temperature thereof.

6. Heating means comprising a tubular member one end of which is closed, a heating coil located within said tubular member, means of insulating material mounted upon the end of said tubular member opposite the closed end thereof and projecting into the said tubular member for supporting the said heating coil, leads having connection with the opposite ends of the said heating coil, both of the said leads extending outwardly through a portion of the support of insulating material by which the said coil is supported, and one of the said leads extending through the said coil, and resilient yielding means operating upon the said last mentioned lead to exert pressure thereon and upon the said coil.

7. An electric heating means comprising a wire coil of electric current resistance material through which an electric current is adapted to flow to heat the same, a tubular support around which the said coil is wound, lead wires having connection with the opposite ends of said coil, said lead wires having coils wound around the said tubular support and located in adjoining relation to the opposite ends of the said heating coil and being slidable thereon, one of the said lead wires exending through the said tubular support and having connection at its outer end to a movable member, and yielding resilient means normally under compression and tending to cause outward movement of the last mentioned lead wire and thereby operating to apply compressive pressure to the said heating coil.

8. An electric heating means comprising a tubular member, a wire coil of electric current resistance material located within the said tubular member through which coil a current of electricity is adapted to flow to heat the same, a cylindrical tubular member of insulating material located within and extending axially of the first named tubular member and being spaced therefrom, means mounted in one end of the first named tubular member for supporting the said cylindrical tubular member of insulating material, movable members located upon the said cylindrical tubular member in adjoining relation to the opposite ends of the said heating coil and having connection with the said ends, wires extending from the said movable members, one of said wires extending through the said cylindrical tubular supporting member and having connection at its outer end with a movable member slidable within a portion of the support for the said cylindrical tubular member, and yielding resilient means having contact with the last named movable member and acting therethrough to exert a pulling force upon the last named lead wire and operating thereby to impose a compressive pressure upon the said heating coil.

In testimony that I claim the foregoing as my invention I have hereunto signed my name this 3rd day of May, A. D. 1928.

RUDOLF VON BROCKDORFF.